United States Patent [19]
Jamzadeh et al.

[11] Patent Number: 5,522,657
[45] Date of Patent: Jun. 4, 1996

[54] OPTIMIZATION OF ELECTRONIC COLOR PRINTING PROCESS FUNCTIONS BASED ON PRESCAN INFORMATION DATA

[75] Inventors: Feraydoon S. Jamzadeh, Fairport; Robert E. Zeman, Webster, both of N.Y.

[73] Assignee: Eastman Kodak Company, Rochester, N.Y.

[21] Appl. No.: 21,914

[22] Filed: Feb. 24, 1993

[51] Int. Cl.⁶ .............................. H04N 1/23; H04N 1/46; G03B 27/44; G06K 9/00
[52] U.S. Cl. ..................... 358/302; 358/504; 355/54; 382/319; 347/232
[58] Field of Search ..................... 358/296, 300, 358/302, 406, 474, 504, 530; 355/54, 271, 277, 279; 382/16.18, 41, 44, 45, 51, 52, 63, 190–192, 276, 293, 295, 272, 319, 168; 347/112, 114, 115, 171, 217, 221, 232; 395/109, 117, 118, 131, 133, 148, 153, 161, 162

[56] References Cited

U.S. PATENT DOCUMENTS

| | | | |
|---|---|---|---|
| 4,638,371 | 1/1987 | Milch | 358/293 |
| 4,639,769 | 1/1987 | Fleisher et al. | 358/27 |
| 4,927,727 | 5/1990 | Rimai et al. | 430/99 |
| 4,968,578 | 11/1990 | Light et al. | 430/126 |
| 5,021,835 | 6/1991 | Johnson | 355/271 |
| 5,040,026 | 8/1991 | Jamzadeh | 355/271 |
| 5,049,985 | 9/1991 | Outa | 358/76 |
| 5,062,058 | 10/1991 | Morikawa | 358/75 |
| 5,079,624 | 1/1992 | Sasuga et al. | 358/75 |
| 5,164,837 | 11/1992 | Hirosawa | 358/296 |
| 5,173,783 | 12/1992 | Oku et al. | 358/302 |
| 5,175,628 | 12/1992 | Jamzadeh et al. | 358/300 |
| 5,194,946 | 3/1993 | Morikawa et al. | 358/75 |
| 5,210,600 | 5/1993 | Hirata | 358/474 X |
| 5,223,954 | 6/1993 | Miyakawa et al. | 358/474 |
| 5,369,426 | 11/1994 | Jamzadeh | 346/157 |

Primary Examiner—Peter S. Wong
Assistant Examiner—Eric Frahm
Attorney, Agent, or Firm—Lawrence P. Kessler

[57] ABSTRACT

In an electronic color printing process in which an array of images from respective frames of a filmstrip or the like is provided on print receiver sheets or alternative storage media from information signals representing image information, producing prints from the array of images. The prints are produced by prescanning, at low resolution, an array of images contained on respective frames of a filmstrip or the like. Information data, obtained during low resolution prescanning, of at least the scene content of the respective images, are stored and operating parameters based on the stored information data are calculated to determine required process functions of the electronic printing process. Based on the determined required process functions, optimum process functions for the electronic printing process are set.

39 Claims, 4 Drawing Sheets

OPTIMIZATION OF ELECTRONIC COLOR PRINTING PROCESS FUNCTIONS BASED ON PRESCAN INFORMATION DATA

BACKGROUND OF THE INVENTION

The present invention relates in general to electronic color printing of images contained in a filmstrip, and more particularly to optimization of process functions of electronic color printing based on information data, of images to be printed, obtained during a low resolution prescan of such images.

Electronic printing, such as electrophotographic reproduction, by an apparatus for photofinishing images contained in an original filmstrip (e.g., a 35 mm color negative filmstrip) has been shown and described in Jamzadeh et al U.S. Pat. No. 5,040,026, issued Aug. 13, 1991. Such apparatus operates to sequentially scan the respective image frames of an original filmstrip and produce, by an electrophotographic process, full color prints on a non-photosensitive print receiver sheet. In the electrophotographic process, a set of color separation marking particle images (e.g., cyan, magenta, and yellow) are formed on a reusable photoconductive recording member, one set for each of the respective original image frames on the filmstrip. The set of color separation marking particle images are transferred in register to a print receiver sheet to form the desired full color print.

With electrophotographic reproduction, in order to facilitate handling of the print receiver sheets, as well as to enhance the efficiency of the overall print-making process, each print receiver sheet is considerably larger than the commonly desired sizes of photographic prints. Several color prints are formed on each receiver sheet. For example, assuming a print receiver sheet having a size (in inches) of 12×18, it is disclosed in the aforementioned '026 patent that nine 4×6 prints be produced on the receiver sheet in a three-by-three, two dimensional array. This three-by-three array, referred to as a "9-up" format, would be a desirable format due to the current popularity of photographic prints of this 4×6 inch size. In the event larger prints are desired (e.g., 5×7 inch prints), four of such prints may be formed on a print receiver sheet of this size in a two-by-two, or "four-up", format. After forming multiple images on the print receiver sheet, the receiver sheet is then cut by any well known cutting and slitting apparatus to provide the smaller size prints or "snapshots".

It has been found that when multiple prints are produced on a receiver sheet in the above-described manner there are certain conditions imposed on the electronic printing process which may have an adverse effect on the quality of the completed prints. A prime contributor to the adverse effects relates to the cumulative nature of particular scene contents of the images from which the prints are to be reproduced.

Scene content is either directly or indirectly related to photoconductive recording member stress, consumption of pigmented marking particles, and thermal requirements for transfer and fusing. As such, repetitive similar scene contents, reproduced on a large size print receiver sheet in the manner described above, may repeatedly stress the photoconductive recording member in a particular area for example. This may result in undue stress being placed on the photoconductive recording member causing its useful life to be reduced to levels which are so low as to adversely impact the economic viability of the electronic printing process. Further, reproduction of such repetitive similar scene contents may cause high localized, or irregular, consumption of the pigmented marking particles used to develop the images. This can result in localized or premature marking particle depletion which can cause insufficient development of subsequent print productions. Additionally, differing scene contents and/or the number of printable frames on each filmstrip may result in irregular thermal requirements for transfer and/or fusing in the printing process. This can have an adverse effect on process timing for transfer and fusing, and on power consumption. As a result, incomplete transfer and/or fusing of the images may occur causing the produced prints to be of an unacceptable quality.

SUMMARY OF THE INVENTION

In view of the foregoing discussion, this invention is directed to electronic color printing of images wherein the process functions thereof are optimized, based on information data, of images to be printed, obtained during a low resolution prescan of such images. According to this invention, in an electronic color printing process in which images from an array of images from respective frames of a filmstrip are provided on print receiver sheets or alternative storage media from information signals representing image information, prints are produced by prescanning, at low resolution, an array of images contained on respective frames of a filmstrip. Information data, obtained during low resolution prescanning, of at least the scene content of the respective images, are stored and operating parameters based on the stored information data are calculated to determine required process functions for the electronic printing process. Based on the determined required process functions, process functions for the electronic printing process are set in a manner to optimize the process. As a result, with the utilization of this invention, the life of the photoconductive recording member may be maximized, marking particle consumption may be readily accommodated and substantially evenly accomplished, and thermal requirements may be accurately predicted and efficiently provided for.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

The following discussion of electronic printing is presented as general background to enable a full understanding of the instant invention. In order to utilize electronic printing for reproducing images from an array of multicolor images contained on a filmstrip, the filmstrip must be scanned by an electronic color scanner which conventionally includes for example a color-responsive CCD (such as shown in U.S. Pat. Nos. 4,638,371, or 4,639,769). The scanner operates to produce, line-by-line and pixel-by-pixel (a pixel is defined as a picture element), electronic signals representing the color content of each image contained in the scanned filmstrip. The signals are stored in a framestore (such as described in Jamzadeh et al U.S. Pat. No. 5,175,628, issued Dec. 29, 1992) to enable subsequent driving of an exposure device in the electronic printer.

Electronically produced signals are also capable of being used for storage of an array of multicolor images (contained in an original filmstrip) on alternative storage media such as a still video floppy or a video disc. Image regeneration devices are then required to read out the stored signals from the alternative storage media for display for example on a CRT or a standard television set. As discussed in Jamzadeh et al copending U.S. patent application Ser. No. 08/021,915, filed on even date herewith, it is desirable to make a print on a single print receiver sheet for a complete array of filmstrip frame images so that such images are readily viewable. Such single print receiver sheet bearing the complete array of filmstrip frame images is referred to as an "index print". That is, when providing prints from a filmstrip containing an array (i.e., series) of images, or when an array of images is stored on alternative storage media, it is advantageous to provide the customer with a single sheet (the index print) containing all of the images, included with the image prints or the alternative storage media.

In the production of the index print according to the aforementioned U.S. patent application Ser. No. 08/021,915, the production of prints, including the index print, for an array of image frames contained on a filmstrip (or video disk) or the like is accomplished by prescanning, at low resolution, an array of multicolor images contained on frames of a filmstrip. Information data, obtained during the low resolution prescan, of scene content of the respective image frames, and additional information data of at least one of where frames of the array are located in the filmstrip, what type of filmstrip is being scanned, the total number of frames on the filmstrip, and what are the conditions of each frame, are stored. Look-up-tables based on the stored information data are defined, and the stored information data is processed with the defined look-up-tables to produce prints of the array of multicolor images. Prints may thereafter be produced, at high resolution, on respective print receiver sheets or, at low resolution, as an index print, on a single print receiver sheet, and the additional information data may be printed in association with the respective image prints on the individual print receiver sheets or on the index print.

According to the instant invention, the information data of at least the scene content of the images to be printed, obtained during the low resolution prescan of such images in the manner described above, is additionally utilized to carry out the optimization of the electronic printing process. Referring to the accompanying drawings, FIG. 1 generally schematically illustrates an electrophotographic color printer capable of producing a plurality of multicolor image frames on a single print receiver sheet. The electrophotographic color printer, designated generally by the letter P, is basically of the type set forth in the aforementioned U.S. Pat. No. 5,040,026, and is described below in sufficient detail for a complete understanding of this invention. Of course, the color printer could alternatively be, for example, a color ink jet printer, a color thermal printer, or any other suitable color electronic printer.

The electrophotographic color printer P comprises a reusable image recording element, for example, a photoconductive recording member in the form of a drum 20. The drum 20 is rotated by a motor, not shown, in a clockwise direction (as viewed in FIG. 1) past a series of processing stations, all of which are well known in the art. These stations include a charging station 22 which operates to uniformly charge the photoconductive surface of the drum 20, and an exposure station 23. The exposure station 23 imagewise exposes the uniformly charged surface to create developable latent electrostatic images thereon. The exposure station may comprise a conventional LED printhead, an ion-depositing head, or as schematically shown, a laser writer 24.

Figure 1:
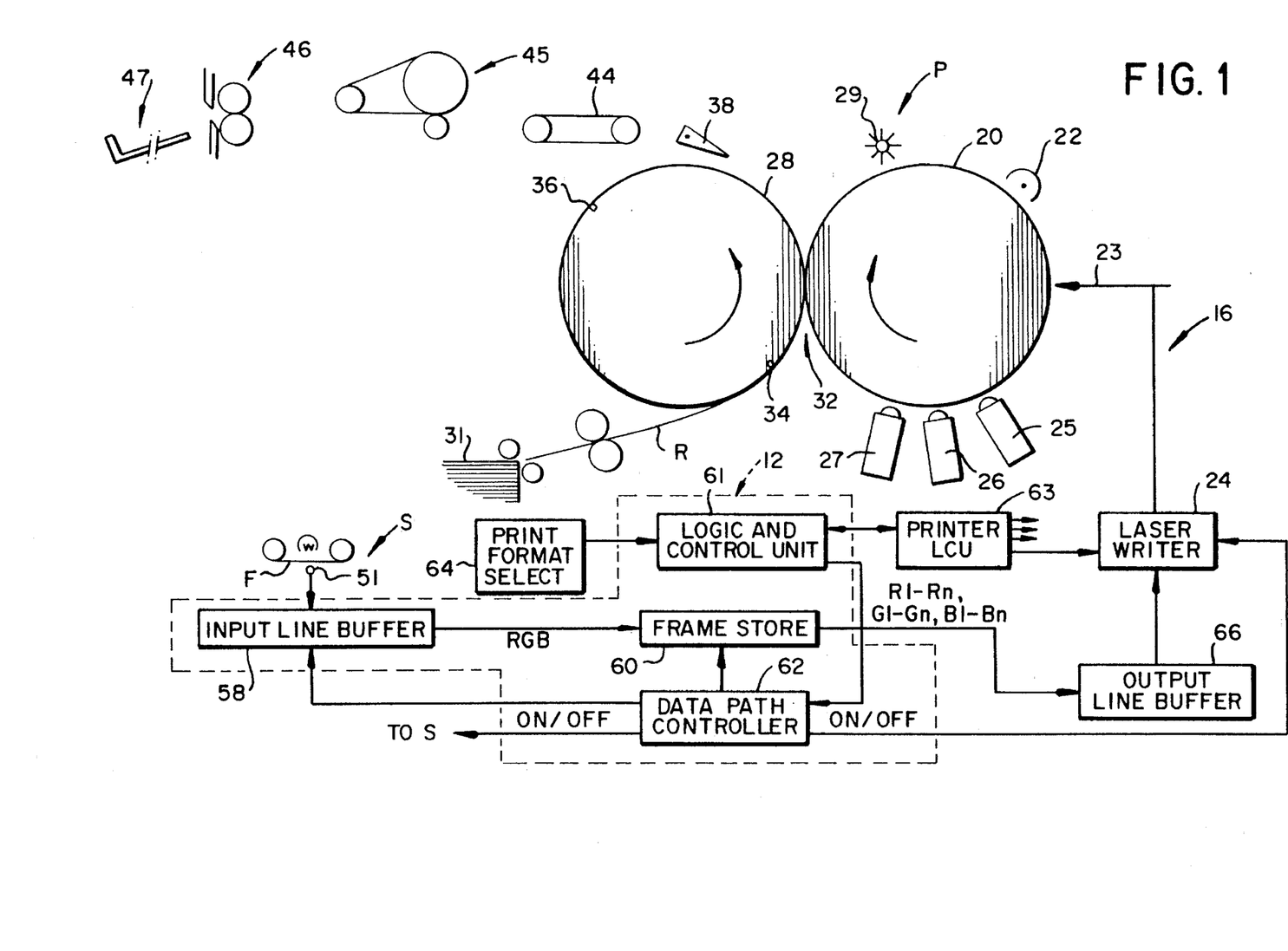
FIG. 1 is a generally schematic illustration of an exemplary electronic printing apparatus for carrying out the generation of prints, in accordance with this invention.

As drum 20 rotates, the intensity of the output beam of laser writer 24 is modulated with color-separated image information data, whereby a series of latent electrostatic images are produced on the drum surface, each representing a color-separated image of the ultimately desired multicolor print. The series of electrostatic images on drum 20 is rendered visible with different color marking particles (e.g., cyan, magenta and yellow toner), by development stations 25, 26 and 27 to produce a series of related toner images. These color-separated toner images are then transferred in registration to the print receiver sheet R carried on the periphery of a transfer drum 28. The photoconductive drum 20 is subsequently cleaned at a cleaning station 29 and recycled through the electrophotographic image-forming process.

Print receiver sheets R are fed, seriatim, from a sheet supply 31 to an image-transfer station 32 defined by the nip between drum 20 and transfer drum 28. As each sheet approaches the image-transfer station 32, it is secured to the transfer drum 28 by vacuum means, gripping fingers or other suitable mechanisms. For example, the leading edge of the sheet can be secured to the transfer drum by vacuum through a row of vacuum ports 34 and the trailing end by vacuum through a row of vacuum ports 36. During each rotation of the transfer drum, one color-separated toner image is transferred to a receiver sheet, for example, by heating the receiver sheet to a degree sufficient to soften the toner and tack the toner to the receiver sheet (see for example Light U.S. Pat. Nos. 4,968,578, issued Nov. 6, 1990; Ramai et al 4,927,727, issued May 22, 1990; and Johnson et al 5,021, 835, issued Jun. 4, 1991).

After the transfer drum 28 has made three (four) revolutions and three related color-separated toner images (plus a black image if a fourth revolution is employed) have been transferred, in superimposed registration, to the surface of a print receiver sheet R, the leading edge of the receiver sheet is stripped from the transfer of drum 28 by stripping mechanism 38. The print receiver sheet R is transported by further rotation of the transfer drum 28 onto a sheet transport 44 which carries it to a fusing device 45 where the transferred images are fixed to the sheet by heat and/or pressure for example. The print receiver sheet R is then cut by any suitable cutting mechanism 46 to provide a plurality of smaller prints, each containing the reproduction from a single multicolor image frame. The resulting prints are collected in a tray 47 or more sophisticated print collecting device of any well known type.

Figure 3:
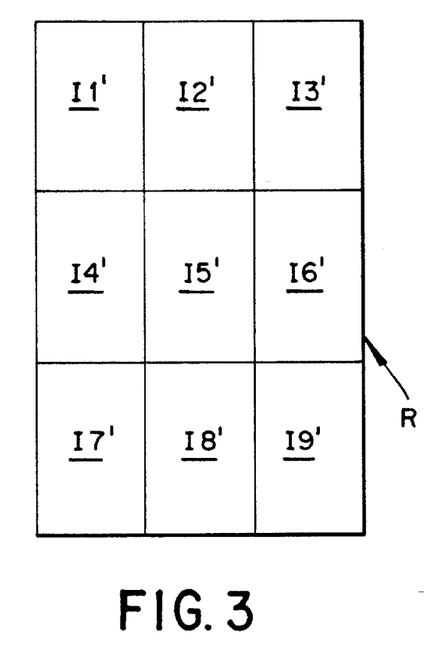
FIGS. 3–5 illustrate various formats in which multicolor image frames can be printed by the electronic printing apparatus of FIG. 1.
Figure 4:
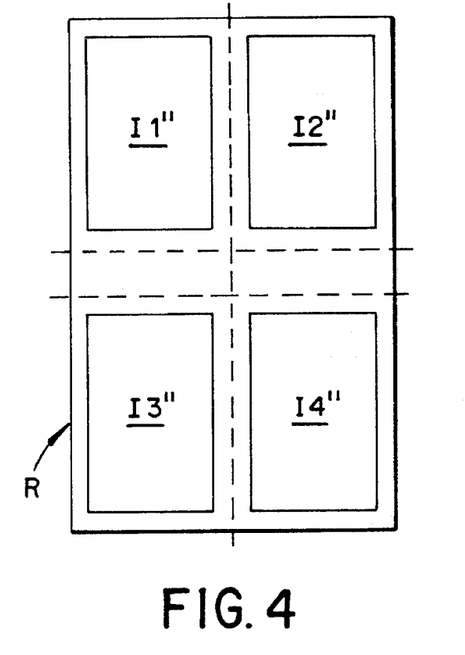
Figure 5:
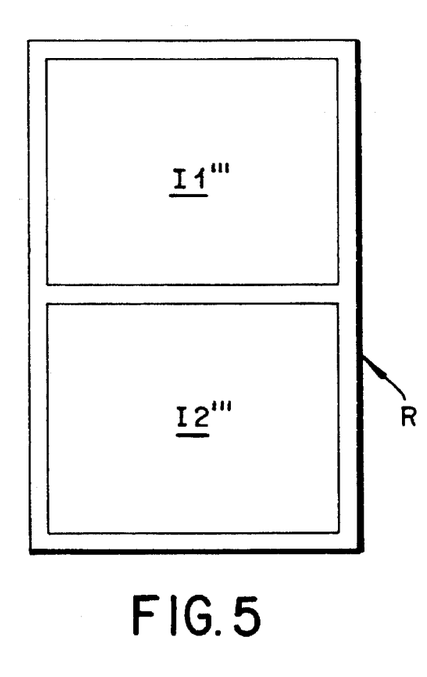
Figure 6:
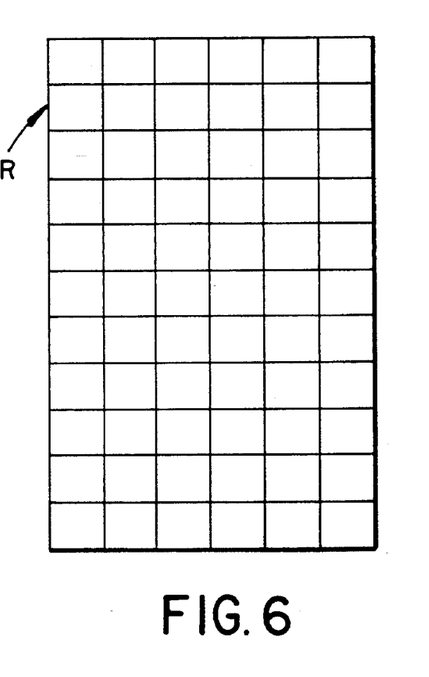
FIG. 6 is an illustration of an index print produced by the electronic printing apparatus of FIG. 1.

In the electrophotographic color printer P apparatus shown in FIG. 1, each print receiver sheet is of a relatively large size, for example, 12 inches by 18 inches. As shown in FIG. 3, such a print receiver sheet R can provide nine 4×6 inch print images ($I_1'$, $I_2'$, ... $I_9'$) exposed edge-to-edge with no waste. As mentioned above, this format is commonly referred to as the "9-up" format. The other print sizes will produce some waste with a 12×18 inch print receiver sheet. FIG. 4 illustrates a "4-up" format in which four 5×7 inch print images ($I_1''$, $I_2''$, ... $I_4''$) are formed on a 12×18 inch print receiver sheet. In FIG. 5, a "2-up" format is shown in which two 8×10 inch print images ($I_1'''$, $I_2'''$) are formed on a 12×18 inch print receiver sheet.

Figures 2, 7:
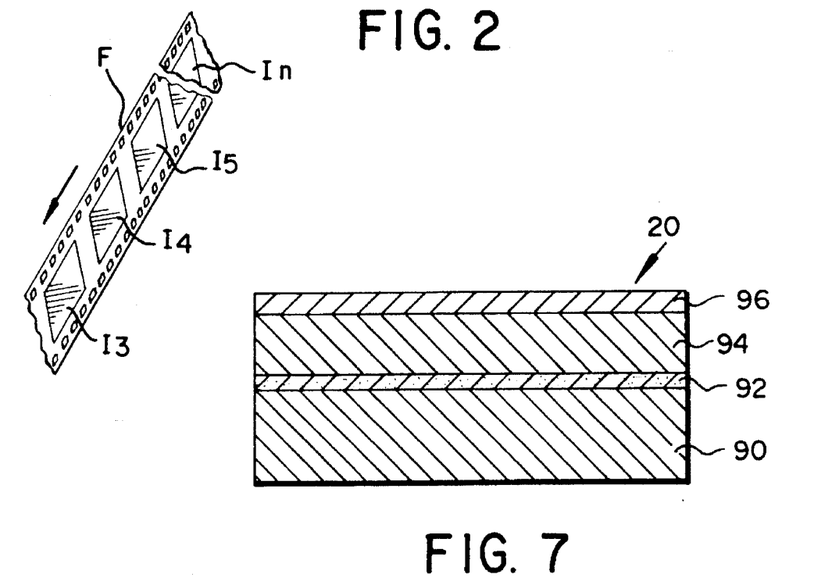
FIG. 2 is a view, in perspective, of a typical filmstrip containing an array of multicolor image frames.
FIG. 7 is a view, in cross-section and on an enlarged scale, of a typical photoconductive recording member.

The input signals to exposure station 23 are provided by a conventional electronic color scanner S which includes a color-responsive CCD 51 (such as shown, for example, in aforementioned U.S. Pat. Nos. 4,638,371 and 4,639,769). Scanner S operates to scan an original multicolor image (e.g., as shown in FIG. 2, respective frames $I_1$, $I_2$, ... $I_n$ of a 35 mm color negative filmstrip) as the filmstrip F is moved past the scanner by any well known drive mechanism (not shown). The scan is accomplished line-by-line and pixel-by-pixel, to produce three color-separated signals, R,G and B, representing the color content of each of the scanned image frames in three spectral regions, i.e., the red (R), green (G) and blue (B) spectral regions. These R,G and B color-separated signals are produced substantially simultaneously and, as they are produced, they are fed to a framestore 60 (discussed below) via an input line buffer 58 of an image data manager 12. The latter serves to buffer a few lines of image data to account for any electronic protocol (SCSI communication) latencies at the scanner/framestore interface, and look-up-table needs inside the filmstrip scanner S.

A logic and control unit (LCU) 61 operates through a data path controller 62 to control the flow of data into and out of the framestore 60, and manage the whereabouts of data in the framestore (i.e. provide a bookkeeping function). The LCU 61 also cooperates with a logic and control unit (LCU) 63 for the electrophotographic color printer P. The LCU 63 receives inputs from various portions of the electrophotographic color printer, including encoders (not shown) associated with the photoconductive and transfer drums (20 and 28, respectively), and transducers associated with the various processing stations to manage the timing of the entire printing process for such apparatus.

One of the inputs to the LCU 61 is from a print format selector 64, whereby an operator can chose any of several different print sizes. Based on the format selected, the LCU 61 instructs the data path controller 62 to extract those pixels from the framestore 60 in the appropriate format required to produce the appropriate format image on a print receiver sheet R. For example, if 4×6 inch prints (i.e. "snapshots") are desired, the LCU 61 instructs the data path controller to extract the stored pixels in a format required to produce the 9-up format on the print receiver sheet. Similarly, if 5×7 inch prints are desired, the LCU 61 commands data path controller 62 to extract those pixels from memory in the required format to print images in the 4-up format. In either case, the framestore 60 is read out in a sequence required to produce multiple color-separated images on the photoconductive drum 20. The data read-out from the framestore 60 is applied to the laser writer 24 via an output line buffer 66 which serves to buffer a few lines of image information to account for latencies in the laser scanner/recording element interface, and data path image manipulation needs.

According to the aforementioned U.S. patent application Ser. No. 08/021,915, the filmstrip F is first scanned by the scanner S at low resolution (referred to hereinafter as a prescan). The low resolution prescan of the scene content of an image frame on the filmstrip, accomplished at on the order of 128 by 192 pixels, has been found sufficient to provide enough scene content data information to enable a recognizable print of an image from an array of image frames on a filmstrip. Also, such low resolution prescan provides the necessary additional information data required for the LUT's needed for subsequent high resolution scanned printing of the filmstrip image frames. At this low resolution, the total data storage for an array of filmstrip image frames is on the order of 20K bytes for each separation, well within the data storage capacity of commonly available, relatively inexpensive computer systems.

To utilize the data information obtained during the low resolution prescan for optimizing the printing process for an electronic color printer such as the printer P, the information data particularly related to at least the scene content of the images to be reproduced are analyzed in the data manager 12 by the LCU 61 to calculate various operating parameters to determine required process functions for the printer. Based on the determined required process functions, such functions are set to optimize the printing process. Particularly, the life of the photoconductive recording member may be maximized, marking particle consumption may be readily accommodated and substantially evenly accomplished, and thermal requirements may be accurately predicted and efficiently provided for.

In order to maximize the life of the photoconductive recording member (drum 20), stressing of the recording member must be reduced. The stress in the photoconductive recording member is induced by electrical fields utilized, as discussed above, in the formation of electrostatic latent images to be developed by the pigmented marking particles. In a typical electrophotographic process, the recording member 20 generally consists of four primary layers (see FIG. 7). That is, the recording member, from bottom to top, consists of a support base 90, a grounding layer 92, a charge transport layer (CTL) 94, and a charge generation layer (CGL) 96. During the electrophotographic process, the recording member is first charged and then heavily discharged in the dark regions by heavy exposure. The light regions do not get discharged as much since they are exposed lightly, or not at all. The more the electrical field is experienced by the recording member, for longer periods of time, between the CGL 96 and the grounding layer 92, the more fatigued (stressed) that part of the recording member will become. Accordingly, light images (images with a scene content of snow or sunny outdoors) put more stress on the recording member than dark images (images with a scene content of night or indoors). Of course the same is true within each image (i.e., light regions are more stressful than dark regions).

The information data from the prescan can easily be processed by the logic and control unit 61 to produce photoconductive recording member exposure values for each color separation image of each image to be printed by the electronic printer P. The exposure values may be in terms of numbers indicating how dark or light the respective separation images will be overall. For example, darker separation images will result in larger numbers. Each number is calculated, for example, by averaging all the pixels of a respective separation image prescan information data, along with consideration for the spatial frequency contents of the separation image.

Utilizing the calculated exposure numbers, the photoconductive recording member stress induced by each separation image can be predicted, the basic assumption being that the darker the image, the less the induced stress. While this is a good first order assumption, there are of course more sophisticated methods such as considering the spatial frequency of the separation image and the effective size of the beam used to expose the photoconductive recording member. From the stress history, subsequent exposures of the photoconductive recording member can be reordered to place highly stressful images in areas of the recording member which have been previously subjected to less stressful exposure and vice-a-versa. Specifically, in the described 9-up printing process, the history of the nine sections of the recording member can be ranked in the order of ascending stress. Then the predicted stress for the images that make up the next 9-up print can be ranked in the order of descending stress. The logic and control units 61 and 63 would then cooperate to cause the laser writer 24 to be driven so as to place the least stressful image in the area of the recording member which has previously been subjected to the most stress, the second least stressful image in the area of the recording member which has previously been subjected to the second most stress, and so on. Accordingly, the overall stress in the photoconductive recording member will be most closely balanced, and life shortening undue stresses will be avoided.

Figure 8:
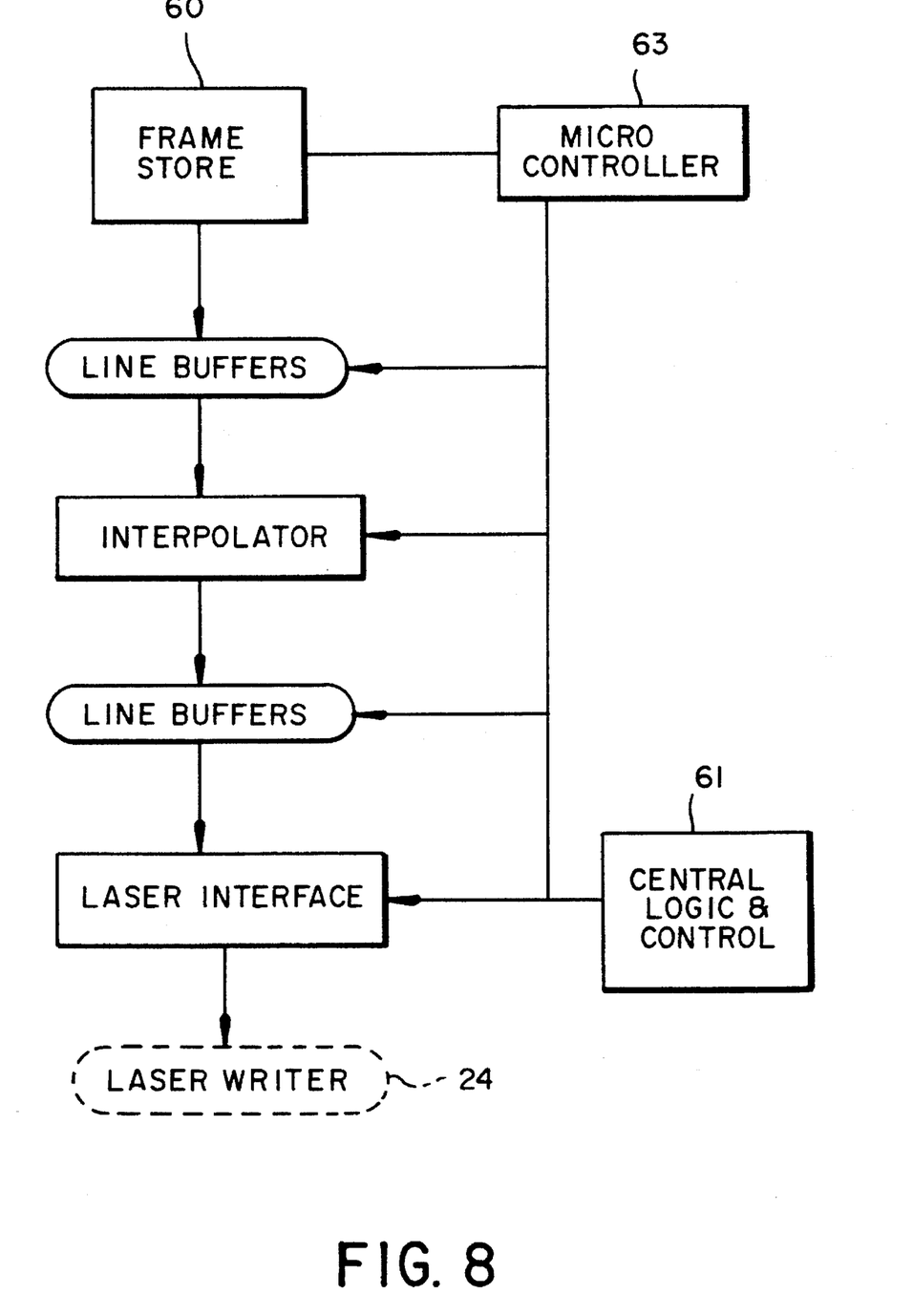
FIG. 8 is a block diagram depicting information flow control for the exemplary electronic printing apparatus of FIG. 1.

While the described process serves to most closely match the stresses in each image receiving area of the photoconductive recording member, a similar process may be used to consider the stress within each image receiving area of the recording member in order to more effectively even out the stresses in any recording member area. For example, images of outdoor scenes typically contain the horizon with different exposure levels at the top and bottom thereof, with clear blue skies translating into light (heavily stressful) exposure on the top part. Thus the top region of areas of the photoconductive recording member in which such images are exposed would be stressed more than the bottom region of such areas. Again, using information data obtained during the prescan to recognize such scene content will enable photoconductive recording member stress to be evened out by reversing the exposure of some of such images. That is, the exposure is reversed by effectively rotating the image 180 degrees (read the image bottom-to-top instead of top-to-bottom, and right-to-left instead of left-to-right). As described above and in U.S. Pat. No. 5,175,628, images are read line-by-line from the frame store 60, interpolated, and sent to the laser writer 24 through the logic and control unit 63 for exposure of the photoconductive recording member 20 (see FIG. 8). Multiple line buffers, facilitating data transfer, could be instructed to operate right-to-left or left-to-right. This will allow for pixel reversal. To achieve line order reversal, the image lines could be extracted backwards from the frame store. The frame store, which is controlled by a microprocessor to keep track of the separation images exposed and to be exposed, could then be instructed to access the lines of a particular image in reverse order.

Turning now to the utilization of prescan information data to optimize the image development process, the prescan information data is processed by the logic and control unit 61 as discussed above to yield numbers corresponding to the relative darkness of respective separation images to be developed. The darker the image, the heavier the usage (or take out) of marking particles to develop such image. The respective concentration of marking particles in the development stations 25, 26, 27, is important to assure adequate image development for production of user acceptable prints. Heavy marking particle usage can prematurely reduce the concentration in a development station to an insufficient level where unacceptable image development occurs. However, determining the darkness of the images to be developed, the prescan information data, and using the darkness to predict the marking particle usage, enables premature concentration reduction to be avoided. That is, once the marking particle usage has been predicted, the printer logic and control unit 63 can operate to accomplish replenishment of marking particles to the development stations at predetermined times to prevent concentration reaching an insufficient level.

Of course, methods of predicting marking particle usage more sophisticated than merely basing usage on image darkness can be used. For example, in an image, different pixels can be weighted differently in making the darkness calculation; or based on a scene balance algorithm, a subset of the pixels from the prescan information data may be used or given a different weight in the darkness calculation. In another method for predicting marking particle usage, the number of pixels and the spatial frequency of the pixels in the particular image are used. Spatial frequency refers to the transitions on adjacent pixels taken in both the in line and between line directions.

It should also be noted that in the described 9-up printing process, heavy marking particle usage images could be aligned in a row. This may result in a localized decrease in marking particle concentration within a given developer station. The result of the localized decreased marking particle concentration may be the production of certain prints of user unsatisfactory quality due to under development. Additionally, in the development process, the arrangement of stack heights of the marking particles making up the developed images may have an adverse effect on the process of transfer of the images to the print receiving sheet. That is, if a low marking particle stack height image is located between two high marking particle stack height images, there is a high probability of poor transfer efficiency for the middle (low stack height) image. This is primarily due to the bridging effect where the transfer drum 28 has to, in effect, squash the two high stack height images before transfer contact can be made with the low stack height image. Good solid contact and compression of the marking particle stack on the photoconductive recording member is required for good transfer efficiency.

As discussed above, the information data from the prescan can easily be processed to produce photoconductive recording member exposure values, in terms of numbers indicating how dark or light the respective separation images will be overall, by averaging all the pixels of a respective separation image prescan information data and considering the spatial frequency of hte separation image, and equating the darkness of an image with the usage (or take out) of marking particles to develop such image.

Figure 9A:
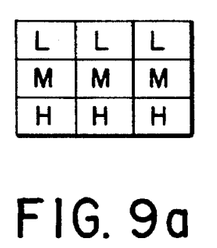
FIGS. 9a and 9b are schematic illustrations of respective image arrangements in the 9-up format.
Figure 9B:
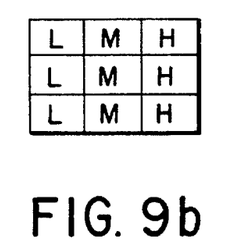

FIGS. 9a and 9b respectively show two different possible arrangements of the same images in the 9-up printing format. Images with heavy marking particle usage are labelled with the letter "H", images with medium marking particle usage are labelled with the letter "M", and images with low marking particle usage are labelled with the letter "L". In the development for images of the arrangement of FIG. 9a, the development station would experience substantially the same marking particle usage along its length (direction cross-track to direction of movement of the photoconductive recording member). On the other hand, in the development for images of the arrangement of FIG. 9b, the development station would experience a relatively high degree of marking particle usage adjacent one end (right end in FIG. 9b), along its length, and a relatively low degree of marking particle usage adjacent its opposite end (left end in FIG. 9b).

If the marking particle usage over the end of a development station subjected to high usage is large enough, the station may not have sufficient marking particles to adequately develop the "H" image in last row of 9-up images. Further, it is clear that the concentration of the marking particles in the development station would not be the same along the length of the station. In order to even out the marking particle concentration, there would have to be substantial mixing of the station contents, and this could result in rapid aging of the contents. Therefore, according to this invention, based on the information data obtained during the prescan, the images are exposed by the laser writer 23, under the control of the logic and control 63, so as to be repositioned in an order similar to the order shown in FIG. 9a.

Figure 10A:
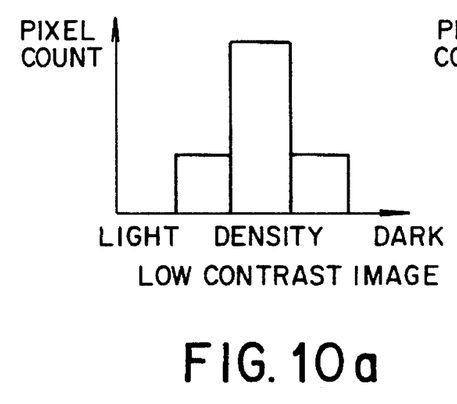
FIGS. 10a and 10b are respective histograms of marking particle stack heights for two images having the same overall marking particle usage but different scene contents.
Figure 10B:
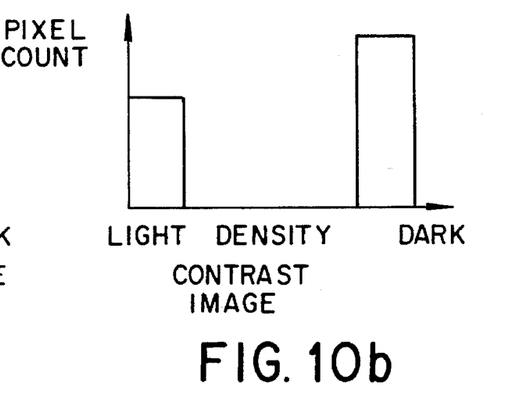

The prescan information data can also be used to predict marking particle stack heights so as to enable the transfer process efficiency to be optimized by repositioning the images as exposed on the photoconductive recording member to avoid bridging as discussed above. The simplest method for determining marking particle stack heights is to look at the darkness of the respective images. The basic good first order assumption is that the darker the image, the higher the average marking particle stack height. A more sophisticated method of predicting marking particle stack heights is to compute histograms of each separation image from the prescan information data. FIGS. 10a and 10b respectively show histograms of two images with substantially equal marking particle usage, but very different local marking particle stack heights. The image represented in the histogram shown in FIG. 10a is of low contrast and exhibits a low probability of tall marking particle stack heights; the image represented in the histogram shown in FIG. 10b is of high contrast and exhibits a high probability of tall marking particle stack heights. The object of this invention (electronic printing process optimization) is accomplished by determining the marking particle stack heights (from the prescan information data), and positioning images having similar stack heights in the same row during printing so as to minimize the chances of poor transfer efficiency due to the bridging effect.

Positioning (locating) the images based on their respective marking particle usage predictions is relatively easy when the images are monochrome. The images need only to be rank ordered, and then images with similar marking particle usage positioned next to each other. However, when the images are multicolor, they respectively comprise three (or four) color separation images which must be summed to yield the total marking particle usage.

One method for determining total marking particle usage with three (four) color separation images, and selecting overall images with similar usage is shown by the following example for (for simplicity sake) a 4-up print. The four overall images are designated "a", "b", "c", and "d", and have respective assumed separation image marking particle usage ratings as shown in Table No. 1 (where a rating of "10" represents maximum usage and "0" represents no usage).

TABLE NO. 1

| Cyan | Magenta | Yellow |
|------|---------|--------|
| a1   | b2      | d2     |
| b7   | c3      | a3     |
| c8   | a8      | c4     |
| d9   | d9      | b4     |

The possible number of combinations of two images out of four is 4!/(2!×2!)=6. The term 4! means four factorial or 4×3×2×1. The six possible combinations are listed in Table No. 2 with the differences on marking particle usage between each pair of images in each color separation.

TABLE NO. 2

|         | a, b | a, c | a, d | b, c | b, c | c, d |
|---------|------|------|------|------|------|------|
| Cyan    | 6    | 7    | 8    | 1    | 2    | 1    |
| Magenta | −6   | −5   | −1   | 1    | 7    | 6    |
| Yellow  | 1    | 1    | −1   | 0    | −2   | −2   |

The differences are computed by subtracting the first image usage from the second image usage, i.e., b–a, c–a, d–a, . . . . This explains the reason for negative numbers in the above table. By looking at each column of the table, one can see that the pair (b,c) have the minimum difference in all 3 colors and therefore are the best matched images. In this 4-up example, after selecting (b,c) as the two images in one row, the images of the next row will automatically be set as (a,d). The pair (a,d) does not seem to have similar toner usage in Cyan. But, looking at the large picture of all 4 images in a page, with the proposed pairs of (a,d) & (b,c), the total difference between images in all 3 colors is 8+1+1+1+1+0=12 units. With any other pairs of images this number would be higher, indicating less matched pairs. For example, the pairs (a,b) & (c,d) have total usage differences of 6+6+1+1+6+2=22.

The solution shown above for the 4-up example could be expanded to the 9 images of the 9-up print. The number of triplets to consider is 9!/(3!×6!)=84. For example, the triplets would be (a,b,c), (a,b,d) (a,b,e), . . . (f,h,i), (g,h,i). The same rule as above is used to define the differences: c−b−a, d−b−a, . . . i−h−g. Once the table with its 84 entries are computed for 3 or 4 color separations, the column with the minimum values is searched for, similar to the above example. It may be argued that the triplets (a,b,c) & (c,b,a) & (a,c,b) & . . . are not the same and they should be considered separately. There are two reasons for not doing that. If the order of the elements of the triplet are considered, the total number of the triplets to be accounted for would rise to 9!/3!=60,480. This is a very large number of triplets to compute marking particle usage differences for each of them in the 3 colors. The other reason for treating (a,b,c) & (c,b,a) & . . . as the same is that the goal is to find the triplets with minimum differences. Thus, once it is determined that (a,b,c), for example, is the triplet with minimum marking particle usage difference, it should not matter if (a,b,c) or (c,b,a) or . . . is used. They all have very similar marking particle take outs. This minimum difference triplet defines the 3 images on one row of the 9-up page.

With the selection of the minimum difference triplet, other triplets that do not have any of the images of the minimum difference triplet are looked for. Again, the triplet with smallest differences is picked and that would define the second row of the 9-up format page. The third row would be the 3 images not selected in the first two triplets. In the 9-up format, two triplets out of 84 possible candidates is looked for. In the 4-up case, one pair out of six possibilities is looked for. It is clear that in the 9-up format situation, there are many more choices to select from and therefore should come up with better matched images in each row.

In the process of selecting the best matched triplets, one could give different weights to the mismatches in each color. Typically, in the transfer process the last color to be transferred is the one that suffers most from lower transfer efficiency (usually yellow). By giving more weights to the differences in the yellow separations, one could make sure to get the best compromise for matching the yellow separations versus the other color matches.

The probability of having triplets with identical marking particle usage is fairly low. There is an advantage to positioning the images with heavier take outs closer to the replenishment end of the development stations. The advantage is that the replenished marking particles need to travel less to compensate for the used (taken out) marking particles. This could prevent wide differences of marking particle concentration across the development stations and could help the process stability.

Turning now to the utilization of prescan information data to optimize the accurate prediction of thermal requirements and efficiently provide for such thermal requirements, the prescan information data is processed by the logic and control unit 61 as discussed above to yield numbers corresponding to the relative darkness of respective separation images to be developed. The darker the image, the heavier the usage (or take out) of marking particles to develop such image, and the greater the energy needs for the transfer and fusing processes. This information data from the image frames of a filmstrip, along with the number of frames on the filmstrip, can then be used to predict energy needs for making the prints thereof. For example, the energy needs of a series (e.g., from a thirty-six exposure filmstrip) of dark images (night or indoor scenes) for a 9-up print would be considerably greater than the energy requirements for a series (e.g., from a twelve exposure filmstrip) of light images (snow scenes) due to the fact that the amount of overall marking particles serving to compose the reproduction of such images are considerably greater.

Typically the heaters for the transfer drum 28 and the fusing device 46 are controlled by temperature sensors (not shown) associated with the surfaces of the respective apparatus. When the surface temperatures drop below a lower limit, the respective heater elements are turned on. They stay on until the respective temperature sensor detects a temperature higher than a predetermined upper limit. The thicker (and heavier) the surface layer of the transfer drum or the fusing device, the longer it will take for the surface temperature rise or fall. The delay in achieving the desired temperature at the surface of the transfer drum, or the fusing device, makes precise control of the electronic printing process difficult. For example, when the surface temperature reaches the upper limit and the heater elements turn off, considerable amount of energy has already been radiated to the mass of the apparatus. This stored energy will cause the surface temperature to continue to rise for some finite time after the heating elements have been turned off. If the surface temperature of the transfer drum gets too high, the print receiver sheet will stick to the photoconductive recording member 20, and a very high surface temperature in the fusing device will result in the sticking of the print receiver sheet to the device. Both of these occurrences represent catastrophic failure conditions.

Of course, when the transfer drum 28 begins to transfer cold marking particles from the photoconductive recording member 20 to the print receiver sheet R (which is heated by the transfer drum), the surface temperature of the drum starts to drop. The heating elements will turn on but it will take some finite time for the energy to reach the drum surface. Meanwhile, the transfer drum must continue to operate and heat the print receiver sheets as well as the marking particles. If the surface temperature of the transfer drum drops too low, the transfer efficiency will markedly decrease and the transferred images will have an unacceptable quality (will be motley in appearance). Low temperature in the fusing device results in low gloss of the images reproduced on the print receiver sheets, or ultimately, incomplete fusing of the images to the sheets. Again, this represents a condition which results in user unacceptable prints.

In order to carry out thermal energy control in the transfer drum 28, according to this invention, as an illustrative example, assume that $E1c$, $E1m$, and $E1y$ respectively represent the thermal energies necessary in the transfer nip to sufficiently heat the print receiver sheet R and the marking particle stacks of cyan, magenta, and yellow separation images for efficient transfer of a particular print image. The values of $E1c$, $E1m$, and $E1y$ are directly proportional to the height of the marking particle stacks. Such values are computed from the prescan information data indicating how dark the separation images are. Further, assume that $Eg$ is the energy dissipated from the rest of the transfer drum (nip energy is excluded) during the normal operation; that $Td$ represents the time delay for thermal energy to travel the thickness of the transfer drum 28; and that $Tp$ represents the duration for transfer of a separation image. Of course $Td$ could be a few seconds to several minutes depending on the thickness and material comprising the transfer drum. The transfer drum heating elements would then be turned on $Td$ before the print receiver sheet enters the transfer nip between the transfer drum 28 and the photoconductive recording member 20. Also, the heating elements would be left on for $Tp$ at a power level of $(E1c+Eg)/Tp$ for transfer of the cyan separation image, $(E1m+Eg)/Tp$ for transfer of the magenta separation image, and $(E1y+Eg)/Tp$ for transfer of the yellow separation image. In this manner, the exact amount of thermal energy will be available in the transfer nip when it is called for. Additionally, the heating elements will be powered down (to an idle power level) $Td$ before the last print receiver sheet exits the transfer nip. This will prevent overheating of the transfer drum and will reduce the overall system energy consumption. It is of course clear that such process is equally applicable to controlling the thermal energy of the fusing device.

The invention has been described in detail with particular reference to preferred embodiment thereof, but it will be understood that variations and modifications can be effected within the spirit and scope of the invention as set forth in the claims.

What is claimed is:

1. In an electronic color printing process in which an array of images from respective frames of a filmstrip is provided on print receiver sheets or alternative storage media from information signals representing image information, a method for producing prints from the array of images, such method comprising the steps of:

a) prescanning, at low resolution, an array of images contained on respective frames of a filmstrip;

b) storing information data, obtained during low resolution prescanning, of at least the scene content of the respective images;

c) calculating electronic color printing process operating parameters, based on the stored information data to determine required process functions for the electronic printing process; and d) based on the determined required process functions, setting process functions for the electronic printing process in a manner to optimize the process including regulating replenishment of marking particles used to develop images to be printed.

2. The method for producing prints from the array of images of claim 1 wherein the step of calculating operating parameters includes the steps of determining the total number and average spatial frequency of picture elements in each image to be developed, and producing a control signal representative of the determined total number and average spatial frequency of such picture elements for each image.

3. The method for producing prints from the array of images of claim 2 wherein the step of setting process functions for the electronic printing process in a manner to optimize the process includes the steps of using said control signal produced in the step of calculating operating parameters to determine pigmented marking particle consumption for each image, and, based on the determined marking particle consumption for each image, arranging those images to be reproduced on a receiver sheet in an order which will provide substantially uniform marking particle consumption.

4. The method for producing prints from the array of images of claim 3 wherein the step of arranging those images to be reproduced on a receiver sheet in an order which will provide substantially uniform marking particle consumption includes the step of rank ordering such images and positioning images with similar marking particle usage next to each other on a receiver sheet.

5. The method for producing prints from the array of images of claim 2 wherein the step of setting process functions for the electronic printing process in a manner to optimize the process includes the steps of using said control signal produced in the step of calculating operating parameters to determine the stress placed on the photoconductive recording member by each image, and, based on the determined photoconductive recording member stress, arranging those images to be reproduced on a receiver sheet in an order which will provide substantially uniform stress over the entire photoconductive recording member.

6. The method for producing prints from the array of images of claim 5 wherein the step of arranging images on a receiver sheet includes the steps of rank ordering all images to be reproduced on a first receiver sheet, rank ordering all images to be reproduced on a second subsequent receiver sheet, and arranging the images to be reproduced on the second receiver sheet such that the image of the highest rank to be reproduced on the second receiver sheet is in the same area of the photoconductive recording member as the image of the lowest rank reproduced on the first receiver sheet, the image of the second highest rank to be reproduced on the second receiver sheet is in the same area of the photoconductive recording member as the image of the second lowest rank reproduced on the first receiver sheet, and so forth until the image of the lowest rank to be reproduced on the second receiver sheet is in the same area of the photoconductive recording member as the image of the highest rank reproduced on the first receiver sheet.

7. The method for producing prints from the array of images of claim 5 wherein the step of setting process functions for the electronic printing process in a manner to optimize the process further includes the steps of using said control signal produced in the step of calculating operating parameters to determine the stresses placed on the photoconductive recording member within each image to be reproduced on a receiver sheet.

8. The method for producing prints from the array of images of claim 7 wherein the step of arranging images on a receiver sheet includes the step of, within any particular area of the photoconductive recording member, comparing stresses induced by images to be reproduced in the same area in succession, and if the stresses would be highly localized, reversing the orientation of the subsequent image from the orientation of the previous image in such area.

9. The method for producing prints from the array of images of claim 2 wherein the step of setting process functions for the electronic printing process in a manner to optimize the process includes the steps of using said control signal produced in the step of calculating operating parameters to determine the thermal needs for transfer of a developed image from the photoconductive recording member to a receiver sheet, producing a signal based on the determined thermal needs, and using said last mentioned signal to regulate supply of thermal energy during the transfer process.

10. The method for producing prints from the array of images of claim 9 wherein the step of regulating the supply of thermal energy for the transfer process includes the steps of increasing the supply of thermal energy, based on the determined thermal needs, from a standby level at a predetermined time prior to transfer of an image to assure sufficient thermal energy is available at the desired time for transfer, and decreasing the supply of thermal energy, based on the determined thermal needs, to the standby level at a predetermined time prior to completion of transfer of an image to assure thermal energy will not exceed desired limits when transfer is completed.

11. The method for producing prints from the array of images of claim 10 wherein the predetermined time for increasing thermal energy is substantially equal to the time delay for thermal energy to reach the surface of the transfer device, the time for supplying the increased thermal energy is calculated as being substantially equal to the thermal energy needed at transfer to transfer an image plus the thermal energy needed to account for energy dissipation outside the transfer zone divided by the time for transfer, and the predetermined time for decreasing the thermal energy is substantially equal to the time delay for thermal energy to reach the surface of the transfer device.

12. The method for producing prints from the array of images of claim 2 wherein the step of setting process functions for the electronic printing process in a manner to optimize the process includes the steps of using said control signal produced in the step of calculating operating parameters to determine the thermal needs for fusing images transferred to a receiver sheet, producing a signal based on the determined thermal needs, and using said last mentioned signal to regulate supply of thermal energy during the fusing process.

13. The method for producing prints from the array of images of claim 12 wherein the step of regulating the supply of thermal energy for the fusing process includes the steps of increasing the supply of thermal energy, based on the determined thermal needs, from a standby level at a predetermined time prior to fusing of an image to assure sufficient thermal energy is available at the desired time for fusing, and decreasing the supply of thermal energy, based on the determined thermal needs, to the standby level at a predetermined time prior to completion of fusing of an image to assure thermal energy will not exceed desired limits when fusing is completed.

14. The method for producing prints from the array of images of claim 13 wherein the predetermined time for increasing thermal energy is substantially equal to the time delay for thermal energy to reach the surface of the fusing device, the time for supplying the increased thermal energy is calculated as being substantially equal to the thermal energy needed at fusing to fuse an image plus the thermal energy needed to account for energy dissipation outside the fusing zone divided by the time for fusing, and the predetermined time for decreasing the thermal energy is substantially equal to the time delay for thermal energy to reach the surface of the fusing device.

15. In an electronic color printing process in which an array of images from respective frames of a filmstrip is provided on print receiver sheets or alternative storage media from information signals representing image information, a method for producing prints from the array of images, such method comprising the steps of:

a) prescanning, at low resolution, an array of images contained on respective frames of a filmstrip;

b) storing information data, obtained during low resolution prescanning, of the scene content of the respective images, and additional information data of at least the number of frames on a filmstrip, where frames of the image array are located in the filmstrip, and the conditions of each image;

c) defining look-up-tables based on the information data stored in step (b);

d) calculating operating parameters, based on the stored information data to determine required process functions of the electronic printing process;

e) based on the determined required process functions, setting optimum process functions for the electronic printing process including regulating replenishment of marking particles used to develop images to be printed; and f) scanning, at high resolution, the aforementioned array of images; and g) processing the information data obtained during high resolution scanning with information data stored in step (b) and with the look-up-tables defined in step (c) to produce prints of the array of images under the optimized electronic printing process as set in step (e).

16. The method for producing prints from the array of images of claim 15 wherein the step of calculating operating parameters includes the steps of determining the total number and average spatial frequency of picture elements in each image to be developed, and producing a control signal representative of the determined total number and average spatial frequency of such picture elements for each image.

17. The method for producing prints from the array of images of claim 16 wherein the step of setting process functions for the electronic printing process in a manner to optimize the process includes the steps of using said control signal produced in the step of calculating operating parameters to determine pigmented marking particle consumption for each image, and, based on the determined marking particle consumption for each image, arranging those images to be reproduced on a receiver sheet in an order which will provide substantially uniform marking particle consumption.

18. The method for producing prints from the array of images of claim 17 wherein the step of arranging those images to be reproduced on a receiver sheet in an order which will provide substantially uniform marking particle consumption includes the step of rank ordering such images and positioning images with similar marking particle usage next to each other on a receiver sheet.

19. The method for producing prints from the array of images of claim 16 wherein the step of setting process functions for the electronic printing process in a manner to optimize the process includes the steps of using said control signal produced in the step of calculating operating parameters to determine the stress placed on the photoconductive recording member by each image, and, based on the determined photoconductive recording member stress, arranging those images to be reproduced on a receiver sheet in an order which will provide substantially uniform stress over the entire photoconductive recording member.

20. The method for producing prints from the array of images of claim 19 wherein the step of arranging images on a receiver sheet includes the steps of rank ordering all images to be reproduced on a first receiver sheet, rank ordering all images to be reproduced on a second subsequent receiver sheet, and arranging the images to be reproduced on the second receiver sheet such that the image of the highest rank to be reproduced on the second receiver sheet is in the same area of the photoconductive recording member as the image of the lowest rank reproduced on the first receiver sheet, the image of the second highest rank to be reproduced on the second receiver sheet is in the same area of the photoconductive recording member as the image of the second lowest rank reproduced on the first receiver sheet, and so forth until the image of the lowest rank to be reproduced on the second receiver sheet is in the same area of the photoconductive recording member as the image of the highest rank reproduced on the first receiver sheet.

21. The method for producing prints from the array of images of claim 19 wherein the step of setting process functions for the electronic printing process in a manner to optimize the process further includes the steps of using said control signal produced in the step of calculating operating parameters to determine the stresses placed on the photoconductive recording member within each image to be reproduced on a receiver sheet.

22. The method for producing prints from the array of images of claim 21 wherein the step of arranging images on a receiver sheet includes the step of, within any particular area of the photoconductive recording member, comparing stresses induced by images to be reproduced in the same area in succession, and if the stresses would be highly localized, reversing the orientation of the subsequent image from the orientation of the previous image in such area.

23. The method for producing prints from the array of images of claim 16 wherein the step of setting process functions for the electronic printing process in a manner to optimize the process includes the steps of using said control signal produced in the step of calculating operating parameters to determine the thermal needs for transfer of a developed image from the photoconductive recording member to a receiver sheet, producing a signal based on the determined thermal needs, and using said last mentioned signal to regulate supply of thermal energy during the transfer process.

24. The method for producing prints from the array of images of claim 23 wherein the step of regulating the supply of thermal energy for the transfer process includes the steps of increasing the supply of thermal energy, based on the determined thermal needs, from a standby level at a predetermined time prior to transfer of an image to assure sufficient thermal energy is available at the desired time for transfer, and decreasing the supply of thermal energy, based on the determined thermal needs, to the standby level at a predetermined time prior to completion of transfer of an image to assure thermal energy will not exceed desired limits when transfer is completed.

25. The method for producing prints from the array of images of claim 24 wherein the predetermined time for increasing thermal energy is substantially equal to the time delay for thermal energy to reach the surface of the transfer device, the time for supplying the increased thermal energy is calculated as being substantially equal to the thermal energy needed at transfer to transfer an image plus the thermal energy needed to account for energy dissipation outside the transfer zone divided by the time for transfer, and the predetermined time for decreasing the thermal energy is substantially equal to the time delay for thermal energy to reach the surface of the transfer device.

26. The method for producing prints from the array of images of claim 16 wherein the step of setting process functions for the electronic printing process in a manner to optimize the process includes the steps of using said control signal produced in the step of calculating operating parameters to determine the thermal needs for fusing images transferred to a receiver sheet, producing a signal based on the determined thermal needs, and using said last mentioned signal to regulate supply of thermal energy during the fusing process.

27. The method for producing prints from the array of images of claim 26 wherein the step of regulating the supply of thermal energy for the fusing process includes the steps of increasing the supply of thermal energy, based on the determined thermal needs, from a standby level at a predetermined time prior to fusing of an image to assure sufficient thermal energy is available at the desired time for fusing, and decreasing the supply of thermal energy, based on the determined thermal needs, to the standby level at a predetermined time prior to completion of fusing of an image to assure thermal energy will not exceed desired limits when fusing is completed.

28. The method for producing prints from the array of images of claim 27 wherein the predetermined time for increasing thermal energy is substantially equal to the time delay for thermal energy to reach the surface of the fusing device, the time for supplying the increased thermal energy is calculated as being substantially equal to the thermal energy needed at fusing to fuse an image plus the thermal energy needed to account for energy dissipation outside the fusing zone divided by the time for fusing, and the predetermined time for decreasing the thermal energy is substantially equal to the time delay for thermal energy to reach the surface of the fusing device.

29. In an electronic color printer in which an array of images from respective frames of a filmstrip is provided on print receiver sheets from information signals representing image information, said electronic printer including a photoconductive recording member, marking particle development stations for developing electrostatic latent images on such photoconductive recording member, a transfer device for transferring marking particle developed images from such photoconductive recording member to a receiver sheet, and a fusing device for fusing transferred images to such receiver sheet, a control device for producing prints from the array of images, said control device comprising:

a) means for prescanning, at low resolution, an array of images contained on respective frames of a filmstrip, and producing an information data stream representative thereof;

b) means, responsive to said information data stream for storing information data, obtained during low resolution prescanning, of at least the scene content of the respective images;

c) means for calculating electronic color printing process operating parameters, based on the stored information data to determine required process functions for the electronic printing process; and d) means for setting process functions, based on the determined required process functions, for the electronic printing process in a manner to optimize such process including regulating replenishment of marking particles used to develop images to be printed.

30. The control device for producing prints from the array of images of claim 29 wherein said means for calculating operating parameters includes means for determining the total number and average spatial frequency of picture elements in each image to be developed, and means for producing a control signal representative of the determined total number and average spatial frequency of such picture elements for each image.

31. The control device for producing prints from the array of images of claim 30 wherein said means for setting process functions for the electronic printing process in a manner to optimize the process includes means using said control signal for determining pigmented marking particle consumption for each image, and means for arranging those images to be reproduced on a receiver sheet in an order, based on the determined marking particle consumption for each image, which will provide substantially uniform marking particle consumption.

32. The control device for producing prints from the array of images of claim 31 wherein said means for arranging those images to be reproduced on a receiver sheet in an order which will provide substantially uniform marking particle consumption includes means for rank ordering such images and positioning images with similar marking particle usage next to each other on a receiver sheet.

33. The control device for producing prints from the array of images of claim 30 wherein said means for setting process functions for the electronic printing process in a manner to optimize the process includes means using said control signal for determining the stress placed on the photoconductive recording member by each image, and means for arranging those images to be reproduced on a receiver sheet in an order, based on the determined photoconductive recording member stress, which will provide substantially uniform stress over the entire photoconductive recording member.

34. The control device for producing prints from the array of images of claim 33 wherein said means for arranging images on a receiver sheet includes means for rank ordering all images to be reproduced on a first receiver sheet, rank ordering all images to be reproduced on a second subsequent receiver sheet, and arranging the images to be reproduced on the second receiver sheet such that the image of the highest rank to be reproduced on the second receiver sheet is in the same area of the photoconductive recording member as the image of the lowest rank reproduced on the first receiver sheet, the image of the second highest rank to be reproduced on the second receiver sheet is in the same area of the photoconductive recording member as the image of the second lowest rank reproduced on the first receiver sheet, and so forth until the image of the lowest rank to be reproduced on the second receiver sheet is in the same area of the photoconductive recording member as the image of the highest rank reproduced on the first receiver sheet.

35. The control device for producing prints from the array of images of claim 33 wherein said means for setting process functions for the electronic printing process in a manner to optimize the process further includes means using said control signal for determining the stresses placed on the photoconductive recording member within each image to be reproduced on a receiver sheet.

36. The control device for producing prints from the array of images of claim 35 wherein said means for arranging images on a receiver sheet includes means for comparing stresses, within any particular area of the photoconductive recording member, induced by images to be reproduced in the same area in succession, and means for reversing the orientation of the subsequent image from the orientation of the previous image in such area if the stresses would be highly localized.

37. The control device for producing prints from the array of images of claim 30 wherein said means for setting process functions for the electronic printing process in a manner to optimize the process includes means using said control signal for determining the thermal needs for said transfer device, means for producing a signal based on the determined thermal needs, and means using said last mentioned signal for regulating supply of thermal energy during the transfer process to said transfer device.

38. The control device for producing prints from the array of images of claim 37 wherein said means for regulating the supply of thermal energy for said transfer device includes means for increasing the supply of thermal energy, based on the determined thermal needs, from a standby level at a predetermined time prior to transfer of an image to assure sufficient thermal energy is available at the desired time for transfer, and decreasing the supply of thermal energy, based on the determined thermal needs, to the standby level at a predetermined time prior to completion of transfer of an image to assure thermal energy will not exceed desired limits when transfer is completed.

39. The control device for producing prints from the array of images of claim 30 wherein said means for setting process functions for the electronic printing process in a manner to optimize the process includes means using said control signal for determining the thermal needs for said fusing device, means for producing a signal based on the determined thermal needs, and means using said last mentioned signal for regulating supply of thermal energy during the fusing process to said fusing device.

* * * * *